(12) United States Patent
Terashima

(10) Patent No.: US 7,073,280 B2
(45) Date of Patent: Jul. 11, 2006

(54) CLEAT FOR GOLF SHOES

(75) Inventor: Yasuyuki Terashima, Aichi (JP)

(73) Assignee: Japana Co., Ltd., Aichi (JP)

( * ) Notice: Subject to any disclaimer, the term of this patent is extended or adjusted under 35 U.S.C. 154(b) by 200 days.

(21) Appl. No.: 10/181,571

(22) PCT Filed: Jan. 4, 2001

(86) PCT No.: PCT/JP01/00013
§ 371 (c)(1),
(2), (4) Date: Nov. 13, 2002

(87) PCT Pub. No.: WO01/54528
PCT Pub. Date: Aug. 2, 2001

(65) Prior Publication Data
US 2003/0172556 A1 Sep. 18, 2003

(30) Foreign Application Priority Data
Jan. 24, 2000 (JP) .................................... 2000-14944
Feb. 1, 2000 (JP) ...................................... 2000-024036

(51) Int. Cl.
*A43B 5/00* (2006.01)
*A43C 15/02* (2006.01)

(52) U.S. Cl. .............................. 36/127; 36/134; 36/67 D
(58) Field of Classification Search ................... 36/134, 36/67 R, 67 A, 67 B, 67 D, 59 A, 127; D2/962
See application file for complete search history.

(56) References Cited

U.S. PATENT DOCUMENTS

| 3,054,197 | A | * | 9/1962 | Moegan et al. | ............. 36/59 R |
| 3,512,275 | A | * | 5/1970 | Leavitt | ......................... 36/59 R |
| 4,014,114 | A | * | 3/1977 | Jordan et al. | ................ 36/67 D |
| D385,988 | S | * | 11/1997 | McMullin | ..................... D2/962 |
| D387,548 | S | * | 12/1997 | McMullin | ..................... D2/962 |
| D398,749 | S | * | 9/1998 | Santos | .......................... D2/962 |
| D410,693 | S | * | 6/1999 | Brockman | .................... D2/962 |
| 6,023,860 | A | * | 2/2000 | McMullin | ..................... 36/127 |
| D440,750 | S | * | 4/2001 | Waterbury | .................... D2/962 |
| D449,431 | S | * | 10/2001 | Savoie | .......................... D2/962 |
| D452,062 | S | * | 12/2001 | Savoie | .......................... D2/962 |
| D452,064 | S | * | 12/2001 | Savoie | .......................... D2/962 |
| D452,947 | S | * | 1/2002 | Terashima | .................... D2/962 |
| 6,338,208 | B1 | * | 1/2002 | Waterbury | ..................... 36/134 |
| D463,902 | S | * | 10/2002 | Yang | ............................ D2/962 |
| D473,699 | S | * | 4/2003 | Savoie | .......................... D2/962 |

* cited by examiner

*Primary Examiner*—Ted Kavanaugh
(74) *Attorney, Agent, or Firm*—Adams Evans P.A.

(57) ABSTRACT

A cleat (10) to be used on a golf shoe is disclosed. The cleat (10) includes a cleat body (3), securing means (4) and a plurality of long legs (1) and short legs (2). The long legs (1) and the short legs (2) are provided alternately on the cleat body (3). The long legs (1) protrude outwardly from the cleat body (3) having an angle with an imaginary plane normal to the axis of the cleat in the range 70±15 degrees. The long legs (1) are rigid enough to penetrate through grass while the short legs (2) are rigid enough to retain their shape on a hard surface and press grass hard from above. The cleat having voids between the long and short legs provides excellent grips on grass as grass blades and stalks enter the voids and entangle with the long legs (1) and the short legs (2).

16 Claims, 12 Drawing Sheets

CLEAT FOR GOLF SHOES

BACKGROUND OF THE INVENTION

1. Field of the Invention

This invention generally relates to a cleat. More particularly, this invention relates to a cleat to be used on golf shoes, which provides an excellent grip and bite on grass or turf without damaging the grass or turf. This invention also relates to a method for economically manufacturing plastic cleats.

2. Background Art

Pushpin type sharp metallic spikes are conventionally used on golf shoes. Metallic spikes do provide satisfactory grips and bites on grass or turf, however, metallic spikes will damage grass by the roots. Sharp metallic spikes are rather uncomfortable to wear, especially on hard surfaces such as asphalt roads. They will damage floors of clubhouses.

Plastic cleats have been developed to alleviate the problems associated with metallic spikes. However, conventional plastic cleats do not provide satisfactory grips and bites on grass because they do not effectively tangle with grass blades and stalks.

JP Patent Laid-Open Publication No. 11-262401 teaches a detachable plastic cleat 30 as shown in FIG. 12 of the accompanying drawings, which comprises a threaded shaft 31 and a plurality of flexible legs 32.

Although this plastic cleat 30 will not damage grass or floors of clubhouses, the cleat 30 cannot sufficiently support weight due to the structural flexibility of the legs 32. The legs 32 will open or will be completely deformed outwardly and lose their grip power on grass. The cleat 30 provides wearers with uncomfortable spongy and unstable feelings on hard surfaces. This cleat 30 structurally does not provide good resistance to abrasion and wears out rapidly. It may be possible to increase rigidity of the legs 32, however, then the cleat 30 will damage putting greens.

Accordingly it is an object of the present invention to provide a cleat which provides satisfactory grips and bites on grass or turf by effectively tangling with grass blades and stalks.

It is another object of the present invention to provide a cleat which will not damage grass or turf or floors of clubhouses.

Other objects of the present invention will become apparent from the descriptions that follow.

SUMMARY OF THE INVENTION

The present invention is summarized utilizing the features claimed in the accompanying claims together with the drawings attached to the specification to facilitate easier understanding of the present invention by the readers.

An aspect of the present invention is that a cleat of the invention generally includes a plurality of long legs and a plurality of short legs arranged along the periphery of a cleat body. The number of the long legs and that of the short legs are generally the same and the long legs and the short legs are generally provided on a cleat alternately. However, in an embodiment of the present invention, it is possible to eliminate short legs altogether.

It is to be understood that the number of long legs and the number of short legs need not be the same, where more long legs are used on a cleat than short legs, or more short legs are used on a cleat than long legs. It is within the purview of the present invention to "alternately" arrange different numbers of long legs and short legs along the periphery of a cleat, where there may be provided more than one long legs between two adjacent short legs or more than one short legs between two adjacent long legs, "alternately." It is to be understood also that while providing long legs and short legs along the periphery of a cleat or cleat body is preferred, long legs and short legs may be provided off the periphery in certain design arrangement cases, where, e.g., some short legs are arranged closer to the center of a cleat.

A cleat 10 according to a claim includes a cleat body 3 and a plurality of long legs 1 and a plurality of short legs 2 generally alternately provided on the cleat body 3. The long legs 1 can penetrate into grass or turf and tangle with grass blades and stalks. The long legs 1 are provided at an angle 70±15 degrees with a shoe sole (when the cleat 10 is mounted thereon), gradually opening outwardly from the cleat body. The short legs 2 press grass hard downwardly and chiefly support weight. The long legs 1 and the short legs 2 are provided along the periphery of the cleat 10.

The angle between an imaginary plane which is normal to the axis of the cleat 10 and the long legs 1 is preferably 57–77 degrees (67±10), more preferably 65–75 degrees (70±5), and most preferably 62–72 degrees (67±5).

The legs 1 and 2 are generally provided on the cleat body 3 integrally. The cleat 10 or the cleat body 3 is secured to a shoe sole integrally or detachably by securing means. The cleat body 3 may take practically any shape such as a circle, oval, triangle or square or any other polygonal shape.

The cleat body 3 may additionally be provided with a central protrusion 5. The central protrusion 5 will assist the long legs 1 and short legs 2 in supporting weight resting on the cleat 10. It is preferred that the central protrusion 5 are as tall as the short legs 2 as measured from the cleat body 3.

The cleat 10 may be made of any appropriate plastic material such as a synthetic rubber material, ABS material, polycarbonate material or nylon material. Polyurethane materials are preferred materials.

It is also possible to provide the long legs 1 and the short legs 2 with different plastic materials, a flexible material for the long legs 1 and a rigid and abrasion resistant material for the short legs 2. Soft-type metallic materials or ceramic materials may be selectively utilized or incorporated, fully or partially.

Although use of a plastic material is preferred and advantageous for a number of respects, a metallic material or ceramic material instead maybe possible. A plurality of these materials may be used to provide a compound-type cleat 10 of the present invention.

The cleat 10 of this claim provides good grips and bites on grass or turf because there is provided a difference in length between the long legs 1 and the short legs 2, providing large voids underneath the cleat body 3. The long legs 1 penetrate into the grass and the short legs 2 press the grass hard from above. The long and short legs 1 and 2 effectively tangle with grass blades and stalks. It should be noted that the long legs 1 are not so long as penetrate into ground beneath grass or turf. Therefore, the long legs 1 do not roughen putting greens.

A cleat 10 according to another claim also includes a cleat body 3 and a plurality of long legs 1 and a plurality of short legs 2. The long legs 1 in use do not bend on grass but penetrate through the grass while the short legs 2 press the grass hard from above and securely hold the grass thereunder helped by the friction between the grass and the short legs 2.

The long legs 1 may preferably be made to bend or open outwardly on a hard surface to effectively absorb physical shocks from the hard surface so as to alleviate physical shocks otherwise transmittable to the knees or waist of a wearer.

The cleat 10 of this claim is also capable of providing good grips and bites on grass. The long legs 1 penetrate through grass and the short legs 2 press grass hard from above.

The cleat 10 according to another claim is specifically provided with large voids among the long legs 1 and short legs 2.

Grass blades or stalks get into large voids created between the long legs 1 and the short legs 2 and get tightly caught between the legs 1 and 2 and provide excellent grips. The voids between the legs 1 and 2 can be provided as shown in FIG. 10, or as shown in FIGS. 1 and 8, where grass blades and stalks converge at the bottom center of the cleat body 3, providing excellent entanglement of grass blades and stalks with the legs 1 and 2. The voids are large enough to prevent stuffing with mud.

The cleat 10 of still another claim has long legs 1 which are rigid enough to penetrate into grass practically without deformation. Grass blades and stalks enter the large voids created between the long legs 1 and provide good grips by entangling with the long legs 1.

A cleat 10 according to yet another claim has long legs 1 and short legs 2, both of which are rigid enough not to bend on grass in use. The long legs 1 penetrate through grass and the short legs 2 press the grass hard from above. Grass blades and stalks enter the voids created between the long legs 1 and short legs 2 and entangle with the long legs 1 and the short legs 2 so as to provide good grips and bites on grass.

The long legs 1 have an angle of 70±15 degrees with the shoe sole where the cleat 1 is mounted and are thus capable of providing sufficient grips and bites on sloped grass surfaces as well.

A cleat 10 of another claim is provided replaceable. The cleat 10 is further provided with securing means 4 having engagement means 7 such that the cleat 10 is detachably mounted on a golf shoe sole. The securing means 4 may simply be a threaded shaft to be screwed into threaded receptacle means. The securing means 4 may be reinforced with a metallic pin. It is possible with this cleat 10 to replace a worn out cleat 10 with a new one.

A cleat 10 of yet another claim is also made detachable from a shoe sole, which is provided with long legs 1 and short legs 2. Either the long legs 1 or the short legs 2 or both are provided with grooves 6 on their free ends, which provide further gripping and biting on grass. These grooves 6 also provide a replacement or worn-out indication to indicate when to replace the cleat 10 with a new one.

A central protrusion 5 is optionally provided. The height of the central protrusion 5 is provided practically commensurate with the height of the deepest point of the grooves 6. The central protrusion 5 will start contacting a surface as the abrasion of the legs 1 and 2 progresses, and supports weight. The central protrusion 5 can effectively slow down the progress of abrasion of the legs 1 and 2. Grooves 6 will also assist in producing a cleat 10 by "forced extraction molding" to be described in detail later.

The cleat 10 of yet another claim has long legs 1 which will bend outwardly on a hard surface in use so that their axial height becomes commensurate with the short legs 2, effectively absorbing physical shocks from the hard surface. Weight resting on the cleat 10 will be shouldered by both the bent long legs 1 and the short legs 2. Abrasion of the long legs 1 on hard surfaces will be effectively slowed down.

In a cleat 10 according to another claim the numbers of long legs 1 and the short legs 2 are restricted to three to five. The number of long legs 1 and that of the short legs 2 may not be the same and may be different.

Depending upon the design of the legs 1 and 2 including rigidity of materials used, their thickness and length, the number of long legs 1 can be practically selected from 2 to 8 and the number of short legs 2 can be practically selected from 2 to 8.

The long legs 1 need not be provided at even intervals along the periphery of the cleat body 3, and the short legs 2 need not be provided at even intervals along the periphery of the cleat body 3, either.

Gripping power of the cleat 10 can be provided with directional nature such as shown in FIG. 5, where gripping power is larger in the directions A and is comparatively weaker in the directions B.

A carefully calculated number of cleats 10 are mounted on a shoe sole in a calculated manner including their orientations such that they provide best and desired grips and bites on grass. Additionally providing conventional projections and/or indentations on the shoe sole would provide additional gripping and biting.

A claim defines a method for manufacturing cleats 10 of the present invention by "forced extraction molding." The "forced extraction molding" as used herein is a plastic molding method, whereby a plastic material in a mold is forcedly pushed out of the mold through a "narrow" extraction opening of the mold before the plastic material completely hardens in the mold, which is conducted under conditions including that the forcedly pushed out plastic material can rebound and return to its designed configuration as it gradually gets completely hardened outside the mold.

The voids provided between long legs 1 and the short legs 2 assist in the forced extraction molding. The radial grooves 6 provided on the long legs 1 or the short legs 2 also assist in the forced extraction molding to some extent.

In order to facilitate the forced extraction molding, the angles between the long legs 1 and the shoe sole where the cleat 10 is mounted are advantageously provided at about 67 degrees (66.9 degrees to be exact), however, other angles between 45 and 90 degrees will be equally utilizable.

An appropriate plastic material such as a polyurethane material is injected into a cleat mold having a "narrow extraction opening." This narrow extraction opening is narrower than the widest portion of the cleat 10 to be molded. When the material is half hardened in the mold, the material is forcedly pushed out of the mold with pin means through the narrow extraction opening of the mold. The somehow "shrunk" or "deformed" material gradually rebounds and returns to its designed shape if the shrinkage or deformation is not "excessive."

The "forced extracting molding" lowers the manufacturing costs considerably, as the manufacturing costs for preparing "simple" molds for forced extraction molding is very low and the manufacturing processes are very simple.

According to the tests conducted by the applicant, the cleats 10 of the present invention were found to provide grips and bites which are comparable with those of metallic spikes.

The tests were conducted as follows. A plurality of cleats 10 according to the present invention and a plurality of conventional metallic spikes were respectively secured on heavy metal plates. Those metal plates were pulled on an artificial turf. The forces required to move the plates were measured and compared.

Further, abrasion testing was conducted. Cleats 10 of the present invention and conventional plastic cleats were each loaded with a weight (1 kg) and dragged on a sandpaper in a shape of numeral eight "8" and the degrees of abrasion were observed and compared.

The abrasion tests showed that the cleats 10 of the present invention had excellent resistance against abrasion in comparison with the conventional plastic cleats.

The cleats 10 of the present invention do not damage turf or floors of clubhouses, provide good grips and bites on grass, and effectively absorb physical shocks on hard surfaces.

DESCRIPTION OF PREFERRED EMBODIMENT

Figure 1:
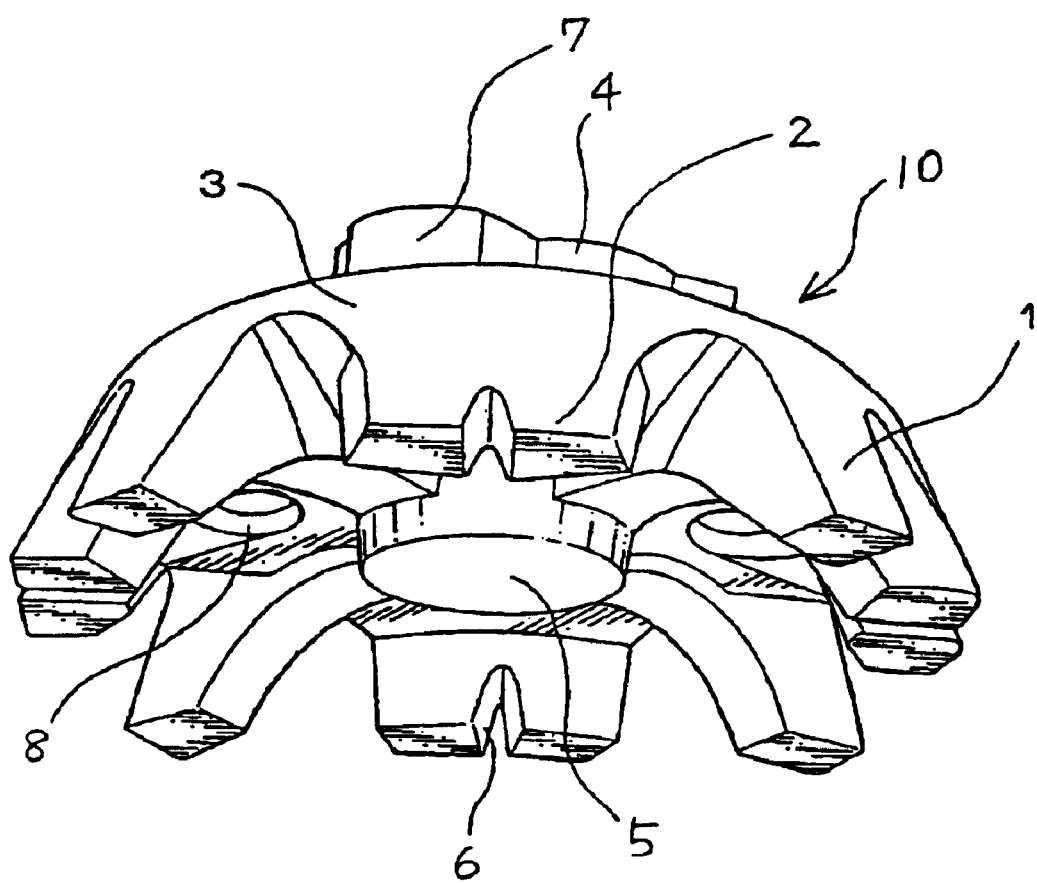
FIG. 1 is a perspective view of a cleat according to an embodiment of the present invention.
Figure 2:
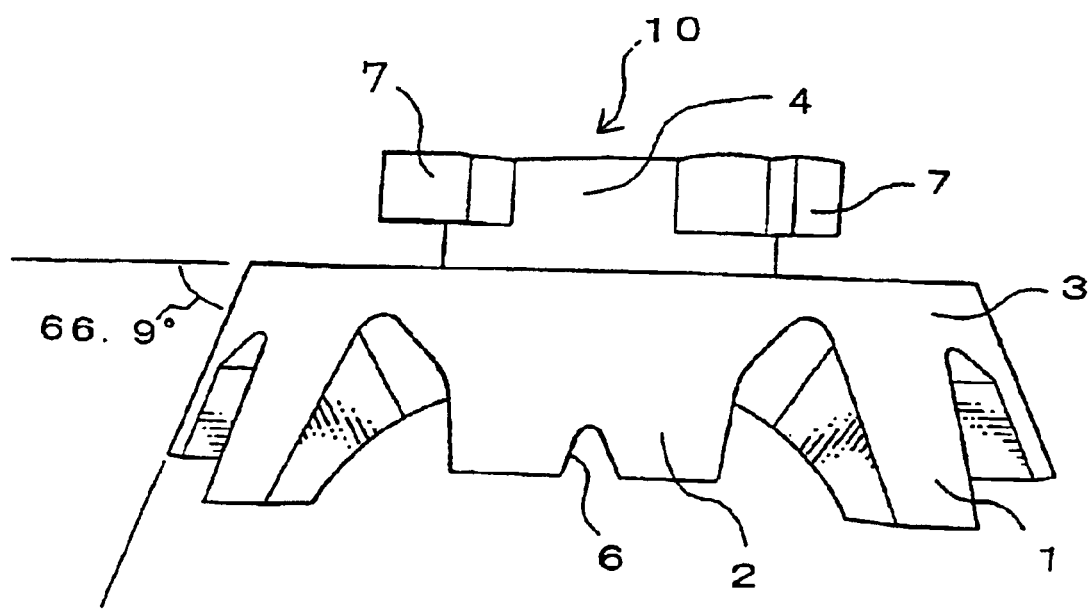
FIG. 2 is a side elevational view of the cleat of FIG. 1, showing its securing means.
Figure 3:
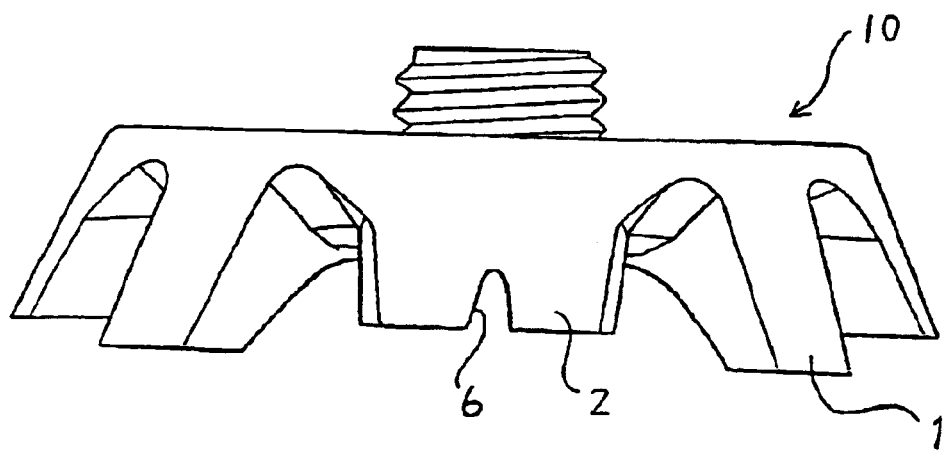
FIG. 3 is a side elevational view of a cleat according to another embodiment of the present invention, having threaded securing means.
Figure 4:
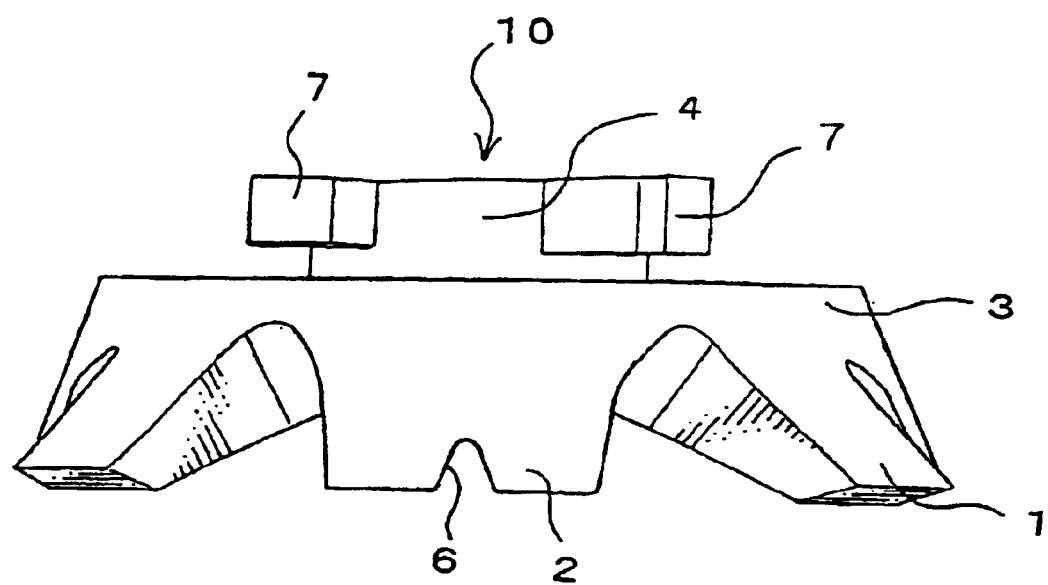
FIG. 4 is a side elevational view of the cleat of FIG. 2, showing a state where its long legs are deformed outwardly.
Figure 5:
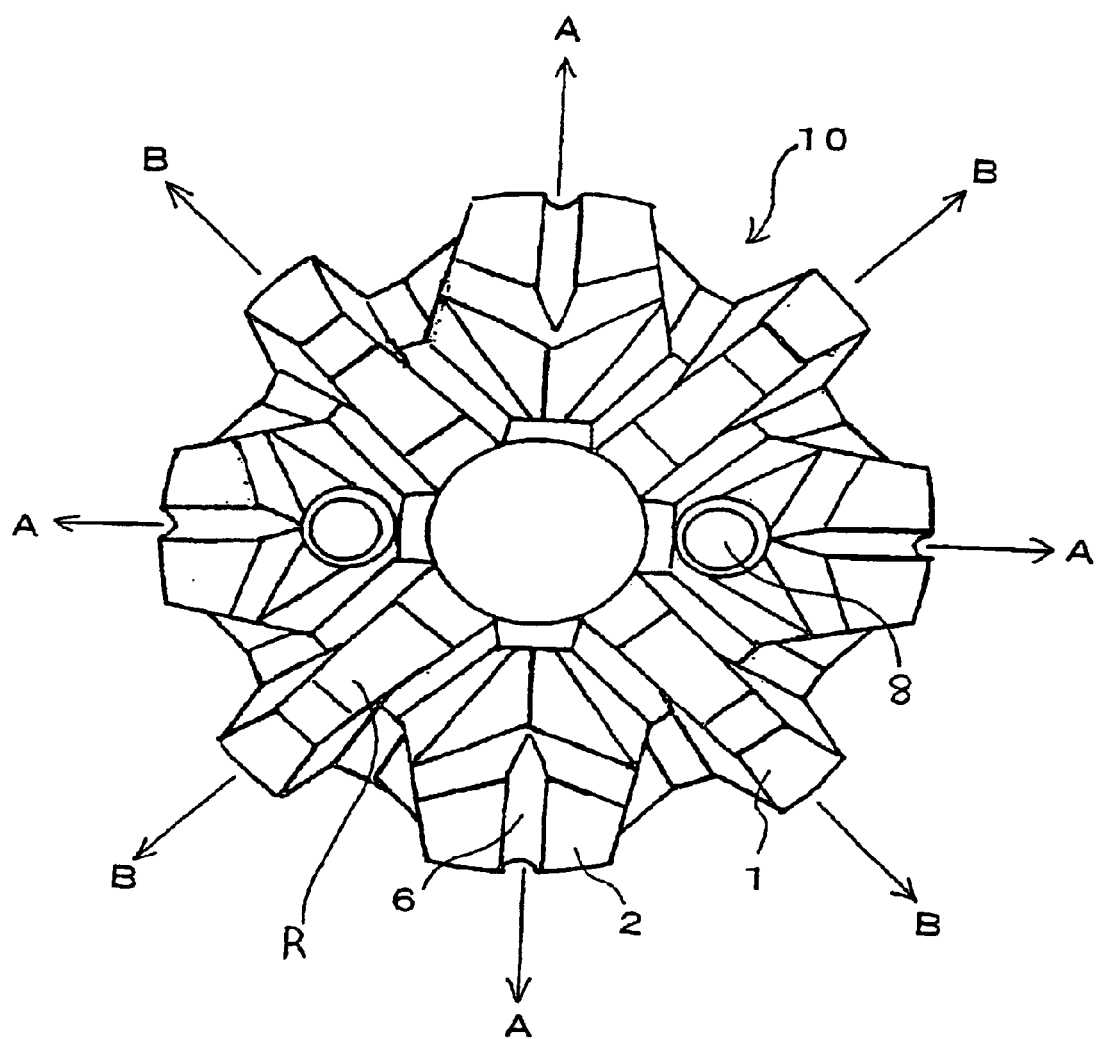
FIG. 5 is a bottom view of the cleat of FIG. 1.
Figure 6:
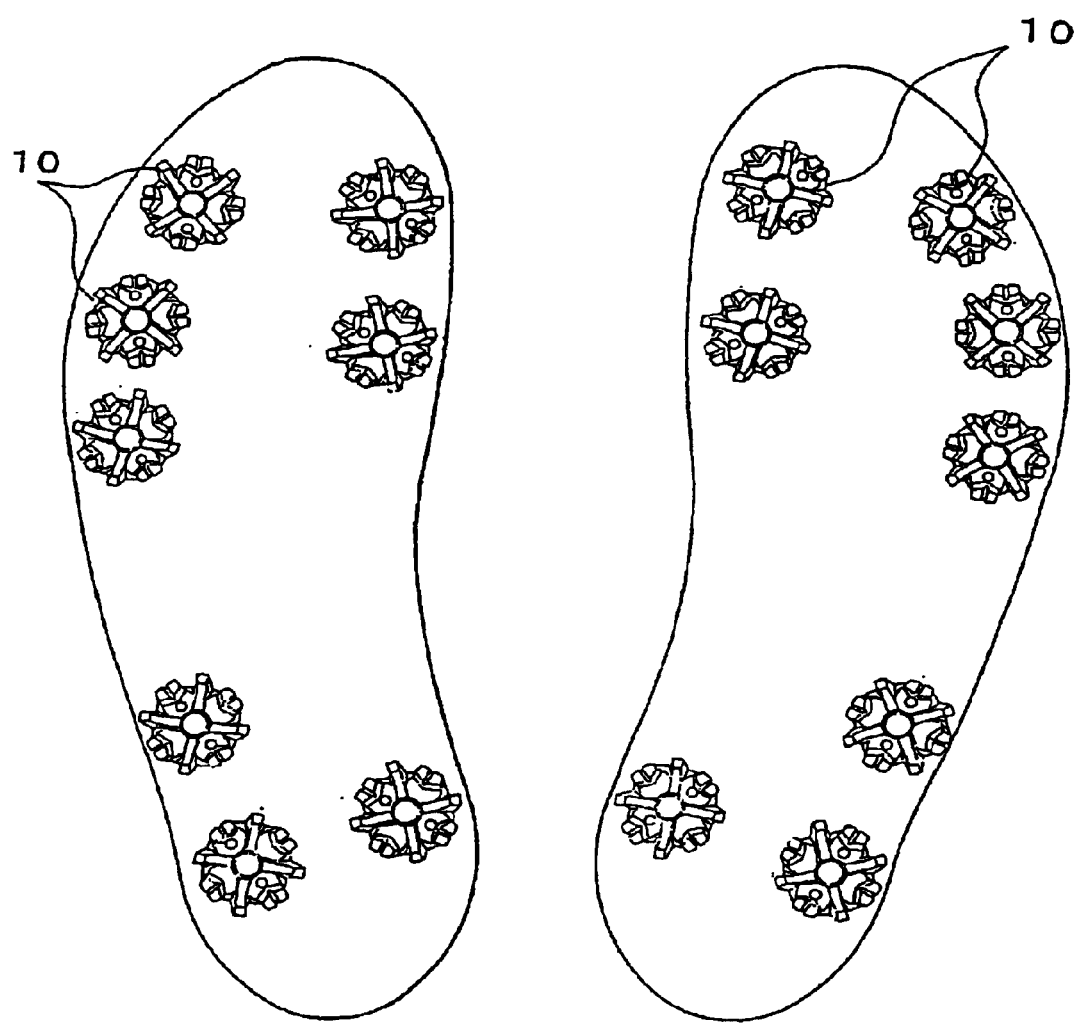
FIG. 6 shows an example of actual utilization on golf shoes of the cleat 10 of FIG. 1.
Figure 7:
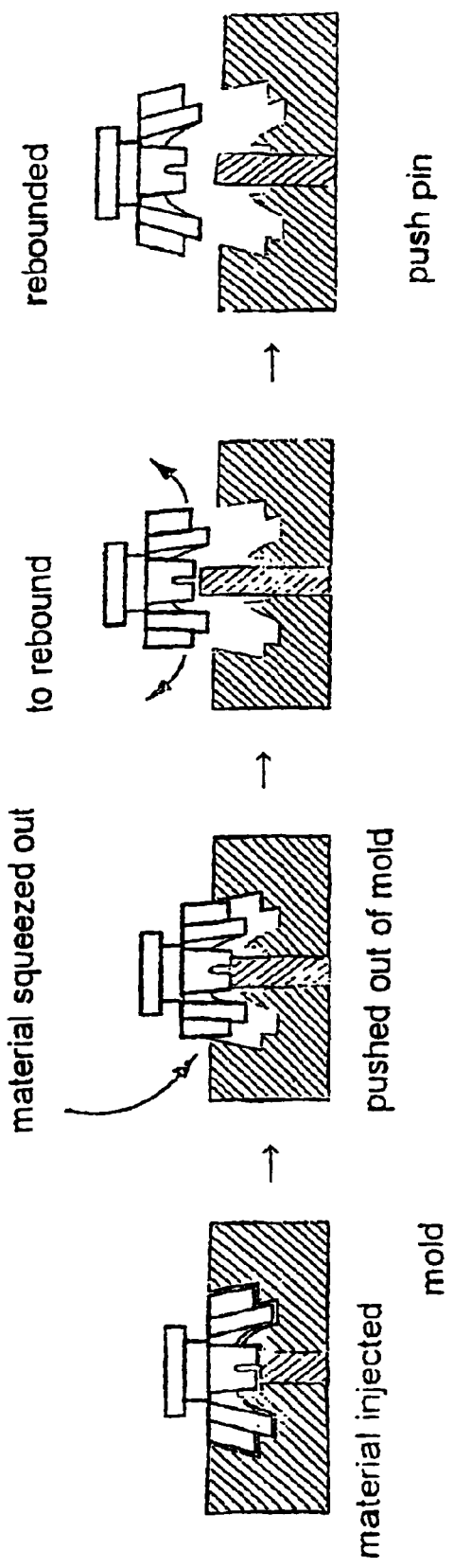
FIG. 7 shows steps of the "forced extracting molding" of the present invention.

FIG. 1 shows a cleat 10 according to an embodiment (No. 1) of the present invention, including a cleat body 3 and securing means 4. From the cleat body 3 four long legs 1 and four short legs 2 extend downwardly. The long legs 1 and the short legs 2 are alternately provided along the periphery of the cleat body 3. A central protrusion 5 is also provided under the cleat body 3. This cleat 10 is made integrally by "forced extraction molding" of the present invention.

The securing means 4 is provided with engagement protrusions 7 which engage engagement grooves (not shown) provided in a receptacle (not shown) which is provided in a shoe sole (not shown). There are two engagement indentations 8 provided under the cleat body 3 which are engaged by handle means (not shown) and turned so as to provide the engagement between the engagement protrusions 7 and the engagement grooves. A metallic pin (not shown) is incorporated in the securing means 4 to reinforce the engagement portion.

The long legs 1 are provided with thickness and rigidity not to bend on grass but bend on a hard surface in use and become as tall axially as the short legs 2, while the short legs 2 are provided with thickness and rigidity not to bend on grass nor on a hard surface. As described, when bent on a hard surface, the long legs 1 become practically as tall axially as the short legs 2 and together support weight resting on the cleat 1.

In this embodiment, each rigid leg 2 is provided with a groove 6 on its free end. The grooves 6 provide an abrasion indication when to replace with a new cleat 10.

The central protrusion 5 is provided as tall as the deepest point of the grooves 6. The central protrusion 5 supports the weight the long and short legs 1 and 2 do not.

The long legs 1 provided at an angle of about 67 degrees with an imaginary plane normal to the central axis of the cleat 10 penetrate through grass and the short legs 2 press the grass hard from above. Grass pieces or blades or stalks enter the voids of the cleat 10 created between the long legs 1 and the short legs 2 and entangle with the legs 1 and 2, providing good grips and bites. Damages to grass as well as to carpets of clubhouses can be kept minimum.

The voids provided between the legs 1 and 2 are large enough to prevent clogging with mud or grass pieces. Therefore, gripping by the cleat 10 can be provided without fail. The physical shocks from a hard surface will be efficiently absorbed by the bending of the long legs 1. Further, the cleat 10 provides safety on a hard surface thanks partially to a large number of contact points with the hard surface.

Figure 8:
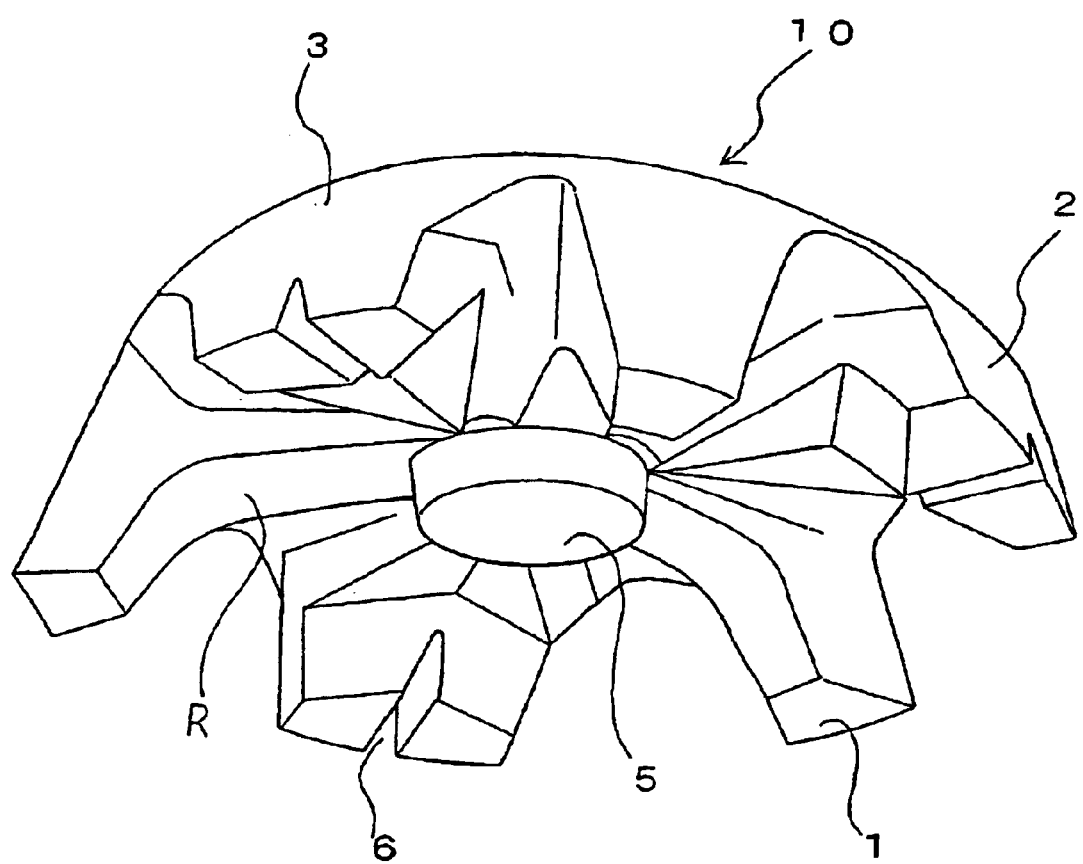
FIG. 8 is a perspective view of a cleat according to another embodiment (No. 2) of the present invention.

FIG. 8 shows a cleat 10 according to another embodiment (No. 2) of the present invention, comprising a cleat body 3, securing means 4 (not shown), three evenly distributed long legs 1 and three evenly distributed short legs 2 and also a central protrusion 5. The cleat 10 further comprises a central protrusion 5. This cleat 10 is also produced by "forced extraction molding."

In this embodiment also, the securing means 4 is provided with three evenly distributed engagement protrusions 7 (not shown). Handle means (not shown) engages two engagement indentations 8 provided on the under side of the cleat body 3 and is turned to engage the engagement protrusions 7 in engagement grooves (not shown) prepared in a receptacle (not shown) in a shoe sole (not shown). The securing means 4 is reinforced with a metallic pin (not shown).

The long legs 1 provided at an angle of about 67 degrees with an imaginary plane normal to the central axis of the cleat 10 are provided to be rigid enough to penetrate through grass but flexible enough to bend outwardly on a hard surface to become as tall axially as the short legs 2.

The short legs 2 are provided shorter and thicker than the long legs 1 and rigid enough to retain their shapes on a hard surface and support weight resting on the cleat 10 together with the bent long legs 1. Each rigid leg 1 is provided with a groove 6 on its free end.

The central protrusion 5 is provided as tall axially as the deepest point of the grooves 6 of the short legs 2.

This cleat 10 provides improved prevention of stuffing of the voids between the legs 1 and 2 over the cleat of the previous embodiment since the voids between the legs 1 and 2 of this embodiment are wider. For that same reason, it is easier to forcedly extract this cleat 10 from a mold (not shown) than the former embodiment cleat 10 because the legs 1 and 2 are given larger leeway to squeeze toward the center of the cleat body 3 when the cleat is squeezed out of a narrow extraction opening of the mold.

Figure 9:
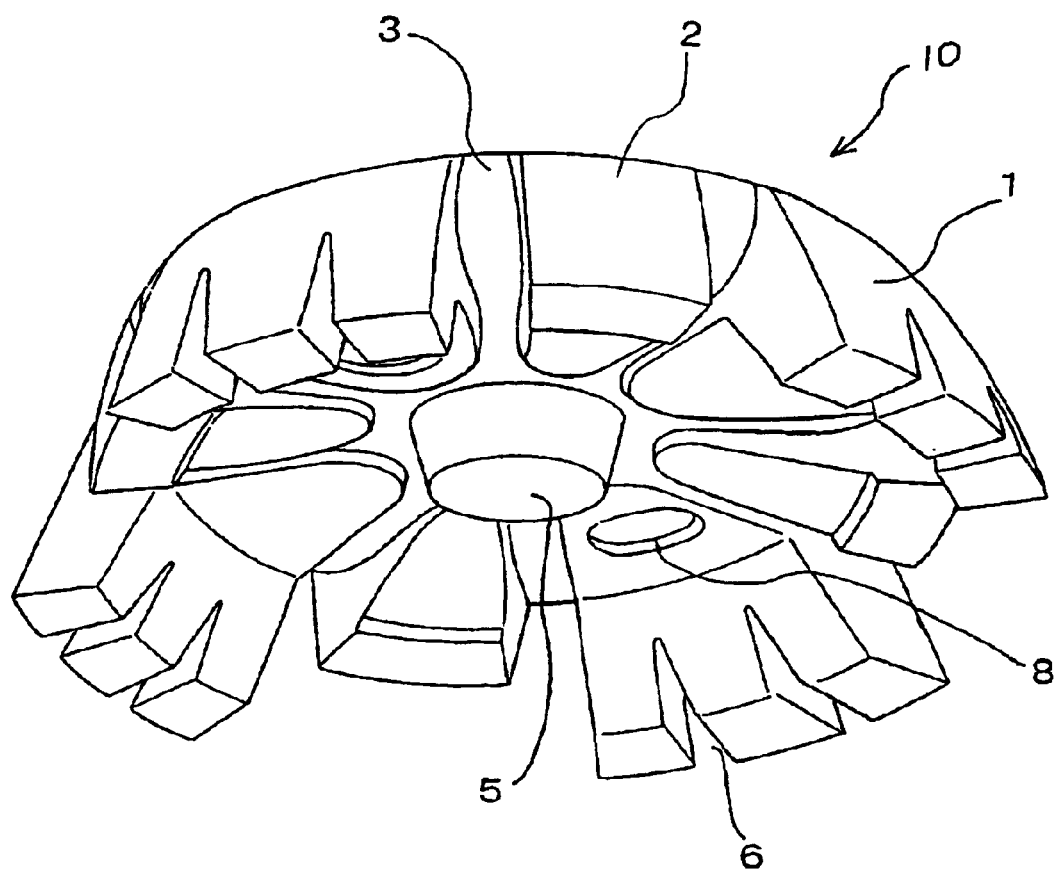
FIG. 9 is a perspective view of a cleat according to another embodiment (No. 3) of the present invention.

FIG. 9 shows a cleat 10 according to another embodiment (No. 3) of the present invention. The long legs 1 in this embodiment are each provided with two radial grooves 6 instead of the short legs 2.

The four long legs 1 are provided rigid enough not to bend on grass but flexible enough to bend on a hard surface while the four short legs 2 are provided rigid enough not to bend even on a hard surface. The grooves 6 on the long legs 1 provide further grips and bites on grass. The central protrusion 5 is provided as tall axially as the deepest point of the grooves 6.

Figure 10:
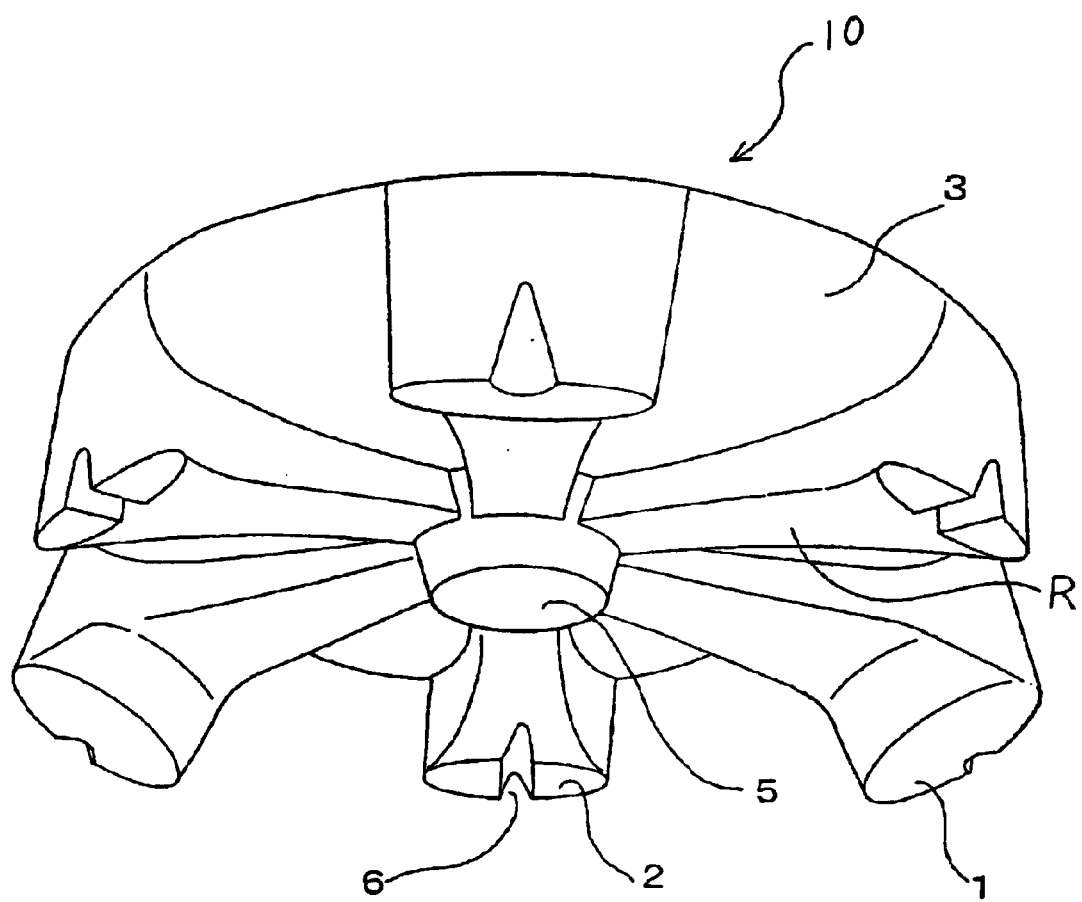
FIG. 10 is a perspective view of a cleat according to still another embodiment (No. 4) of the present invention.

FIG. 10 shows a cleat 10 according to yet another embodiment (No. 4) of the present invention. This cleat 10 is provided with three long legs 1 and three short legs 2. Grooves 6 are provided on the short legs 2. Ribs R are further provided on the bottom side of the cleat body 3, stretching respectively from the long and short legs 1 and 2 to the central protrusion 5 as shown. These ribs R provide additional grips and bites on grass.

Figure 11:
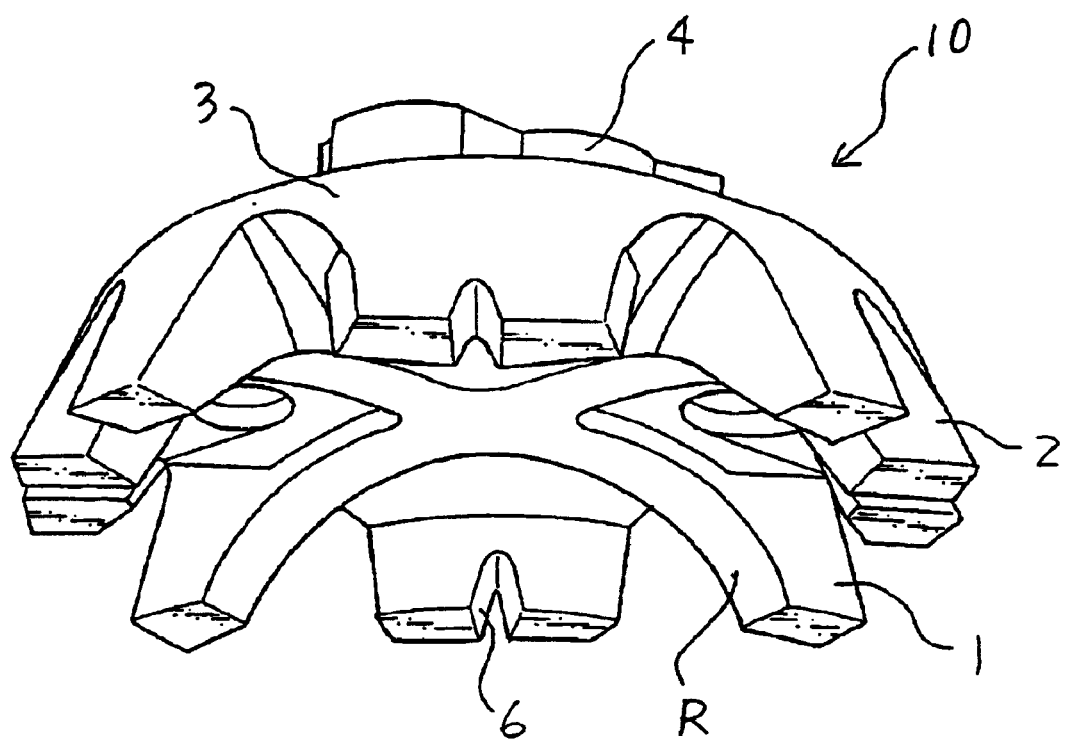
FIG. 11 is a perspective view of a cleat 10 according to yet another embodiment (No. 5) of the present invention.
Figure 12:
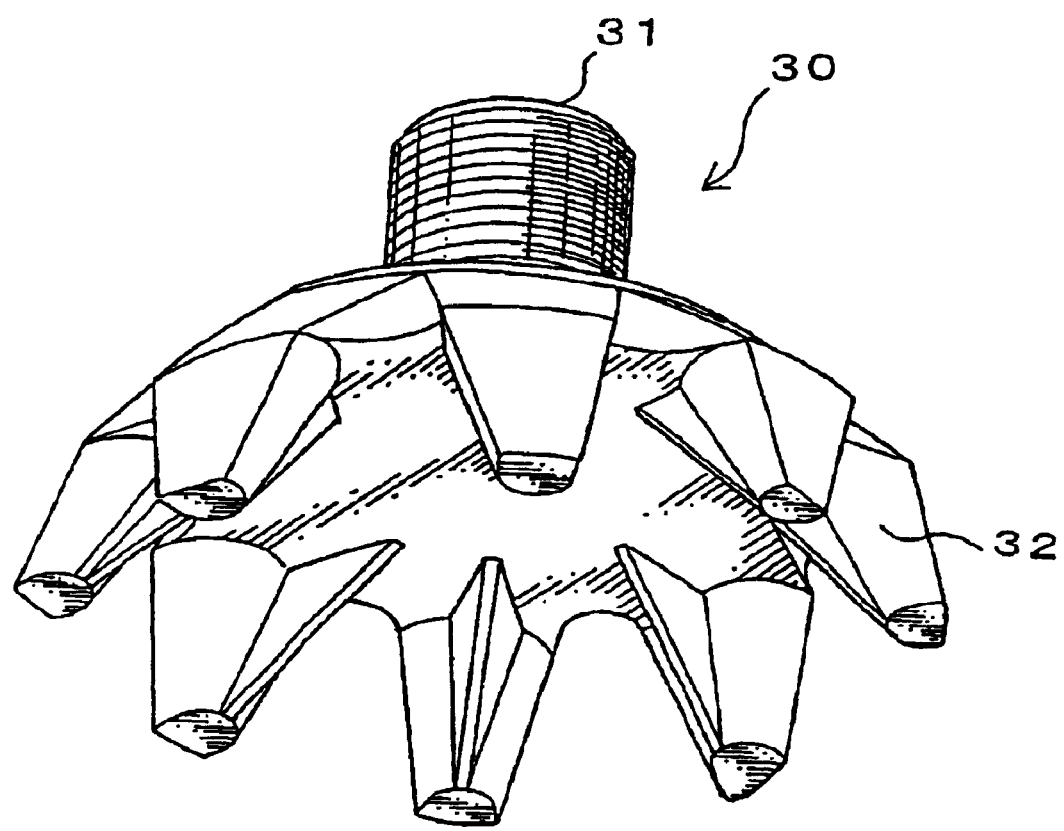
FIG. 12 is a perspective view of a conventional plastic cleat.

A cleat 10 according to still another embodiment (No. 5) of the present invention is shown in FIG. 11. There is no central protrusion 5. Ribs R are respectively provided connecting two long legs 1. These ribs R provide additional grips and bites on grass as well as additional strength or rigidity to the cleat 10.

While this invention has been described using various embodiments, various changes and modifications can be made to those embodiments within the spirit and scope of the present invention.

The cleat 10 of the present invention may be manufactured with a non-plastic material, such as a metallic material or ceramic material, or the cleat 10 may be manufactured with a very rigid type plastic material such that the bending of the long legs 1 on hard surfaces may not happen. Because the most important aspect of this invention is within the shape of the cleat itself, the material made of is not so important.

Central protrusions 5 may be eliminated from those embodiments including a central protrusion 5. These cleats 10 will provide excellent grips and bites on grass or turf without damaging grass or turf.

What is claimed is:

1. A cleat for a shoe, comprising:
   (a) a cleat base having a top surface carrying an attachment means for attaching the cleat to the sole of a shoe, and an opposed bottom surface;
   (b) a plurality of spaced-apart, alternating long and short legs integrally-formed around the periphery of the cleat base and extending radially-outwardly from the bottom surface of the cleat base at an angle of between about 55 and 85 degrees from an imaginary plane normal to a central axis of the cleat base; and
   (c) the long and short legs being spaced-apart so as to form respective voids extending therebetween substantially the entire distance from the bottom surface of the cleat base to respective free ends of the long and short legs for accommodating grass between the long and short legs.

2. The cleat according to claim 1, wherein the long legs and the short legs retain their shapes when pressed into a grass surface.

3. The cleat according to claim 1, wherein the short legs include at least one groove on their respective free end portions.

4. The cleat according to claim 1, wherein the long legs bend on a hard surface to substantially the same height as the short legs.

5. The cleat according to claim 1, wherein the long legs bend on a hard surface and the short legs substantially retain their original shape.

6. The cleat according to claim 1, wherein the number of long legs formed on the periphery of the cleat base is from 3 to 5, and the number of short legs formed on the periphery of the cleat base is from 3 to 5.

7. A cleat for a shoe, comprising:
   (a) a cleat base having a top surface carrying an attachment means for attaching the cleat to the sole of a shoe, and an opposed bottom surface;
   (b) a plurality of spaced-apart, alternating long and short legs integrally-formed around the periphery of the cleat base and extending radially-outwardly from the bottom surface of the cleat base at an angle of between about 55 and 85 degrees from an imaginary plane normal to a central axis of the cleat base; and
   (c) the long and short legs being spaced-apart so as to form respective voids extending therebetween from the bottom surface of the cleat base to respective free ends of the long and short legs, the long and short legs and the voids having a length of at least twice the thickness of the cleat base at positions where the long and short legs meet the bottom surface of the cleat base, wherein the long legs are adapted to penetrate into a grass surface and the short legs are adapted to press onto the grass surface.

8. The cleat according to claim 7, wherein the long legs and the short legs retain their shapes when pressed into a grass surface.

9. The cleat according to claim 7, wherein the short legs include at least one groove on their respective free end portions.

10. The cleat according to claim 7, wherein the long legs bend on a hard surface to substantially the same height as the short legs.

11. The cleat according to claim 7, wherein the long legs bend on a hard surface and the short legs substantially retain their original shape.

12. The cleat according to claim 7, wherein the number of long legs formed on the periphery of the cleat base is from 3 to 5, and the number of short legs formed on the periphery of the cleat base is from 3 to 5.

13. A cleat for a shoe, comprising:
   (a) a cleat base having a top surface carrying an attachment means for attaching the cleat to the sole of a shoe, and an opposed bottom surface;
   (b) a plurality of spaced-apart, alternating long and short legs integrally-formed around the periphery of the cleat base and extending radially-outwardly from the bottom surface of the cleat base at an angle of between about 55 and 85 degrees from an imaginary plane normal to a central axis of the cleat base; and
   (c) the long and short legs being spaced-apart to form respective voids extending therebetween substantially from the bottom surface of the cleat base to respective free ends of the long and short legs to permit the long legs to bend independently of the short legs, the long and short legs and the voids having a length of at least twice the thickness of the cleat base at positions where the long and short legs meet the bottom surface of the cleat base, wherein the long legs are adapted to penetrate into a grass surface and the short legs are adapted to press onto the grass surface.

14. The cleat according to claim 13, wherein an even number of spaced-apart long legs and an even number of spaced-apart short legs are integrally-formed around the periphery of the cleat base.

15. The cleat according to claim 14, wherein the long legs are positioned around the periphery of the cleat base to form opposing pairs.

16. The cleat according to claim 14, wherein the short legs are positioned around the periphery of the cleat base to form opposing pairs.

* * * * *